United States Patent
Hayes

(10) Patent No.: US 9,931,764 B2
(45) Date of Patent: Apr. 3, 2018

(54) POCKETFORMER WITH RELEASABLE GROUT RING AND TENDON, TAIL GAUGE AND METHOD FOR USING

(71) Applicant: Actuant Corporation, Menomonee Falls, WI (US)

(72) Inventor: Norris O. Hayes, Stafford, TX (US)

(73) Assignee: Actuant Corporation, Menomonee Falls, WI (US)

( * ) Notice: Subject to any disclaimer, the term of this patent is extended or adjusted under 35 U.S.C. 154(b) by 260 days.

(21) Appl. No.: 14/690,845

(22) Filed: Apr. 20, 2015

(65) Prior Publication Data

US 2015/0300021 A1    Oct. 22, 2015

Related U.S. Application Data

(60) Provisional application No. 61/981,947, filed on Apr. 21, 2014.

(51) Int. Cl.
*G01B 3/28*     (2006.01)
*B28B 23/04*    (2006.01)
*E04C 5/12*     (2006.01)

(52) U.S. Cl.
CPC ............ *B28B 23/046* (2013.01); *E04C 5/122* (2013.01); *G01B 3/28* (2013.01)

(58) Field of Classification Search
CPC  B28B 7/28; B28B 1/14; B28B 23/024; B28B 7/303; E04C 5/12; E04C 5/122; E04C 2/06; E04C 5/08
USPC .......................................................... 33/518
See application file for complete search history.

(56) References Cited

U.S. PATENT DOCUMENTS

| | | | |
|---|---|---|---|
| 4,773,198 A | | 9/1988 | Reinhardt |
| 4,822,270 A | | 4/1989 | Bonissone et al. |
| 4,918,887 A | * | 4/1990 | Davis ...................... E04C 5/122 52/223.13 |
| 5,024,032 A | * | 6/1991 | Rodriguez ................ E04C 5/12 52/223.13 |
| 5,072,558 A | * | 12/1991 | Sorkin ...................... E04C 5/12 52/223.13 |
| 5,079,879 A | * | 1/1992 | Rodriguez ................ E04C 5/12 52/223.13 |
| 5,423,362 A | | 6/1995 | Knight |
| 6,138,371 A | * | 10/2000 | Lippa ............... G07B 17/00661 33/1 V |
| 6,298,009 B1 | * | 10/2001 | Stringer ................. G01B 11/00 33/1 V |
| 6,651,949 B1 | | 11/2003 | Westhoff et al. |
| 6,964,115 B2 | * | 11/2005 | Kim ........................ E04G 21/10 33/518 |
| 7,174,685 B2 | * | 2/2007 | Hayes ...................... E04C 5/12 52/223.6 |

(Continued)

*Primary Examiner* — Yaritza Guadalupe-McCall
(74) *Attorney, Agent, or Firm* — Michael Best & Friedrich LLP

(57) ABSTRACT

A pocketformer includes a pocketformer body having a tapered exterior surface. The exterior surface has at least one portion along a length thereof of substantially constant diameter. The pocketformer body has a feature for engaging an anchor base in a concrete structure prior to pouring concrete and a grout ring having a substantially constant inner diameter substantially equal in diameter to the at least one portion. The grout ring has an exterior surface shaped to cause retention of the grout ring in set concrete.

13 Claims, 8 Drawing Sheets

(56) References Cited

U.S. PATENT DOCUMENTS

| | | | |
|---|---|---|---|
| 7,216,842 B2 | 5/2007 | Watson | |
| 7,596,915 B2 | 10/2009 | Lee et al. | |
| 7,762,029 B2 * | 7/2010 | Hayes | E04C 5/122 |
| | | | 52/223.13 |
| 8,087,204 B1 * | 1/2012 | Sorkin | E04C 5/08 |
| | | | 52/223.13 |
| 8,813,446 B2 * | 8/2014 | Sladojevic | B28B 23/0056 |
| | | | 52/127.12 |
| 9,317,191 B2 * | 4/2016 | Stanford | G06F 3/04842 |
| 9,604,416 B2 * | 3/2017 | Sorkin | B28B 7/28 |
| 9,624,668 B2 * | 4/2017 | Stanford | E04C 5/122 |
| 2015/0300021 A1 * | 10/2015 | Hayes | B28B 23/046 |
| | | | 33/700 |
| 2015/0330079 A1 | 11/2015 | Sorkin | |

\* cited by examiner

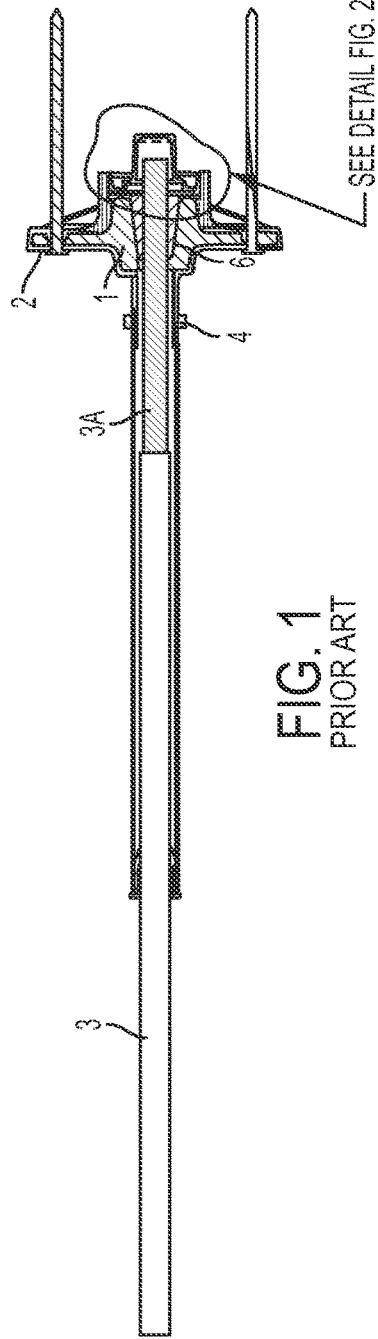
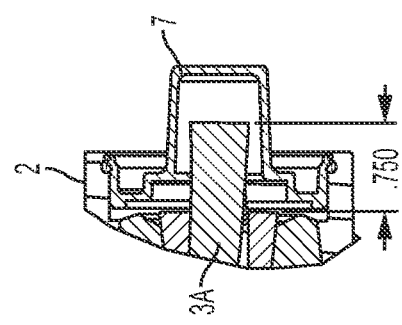

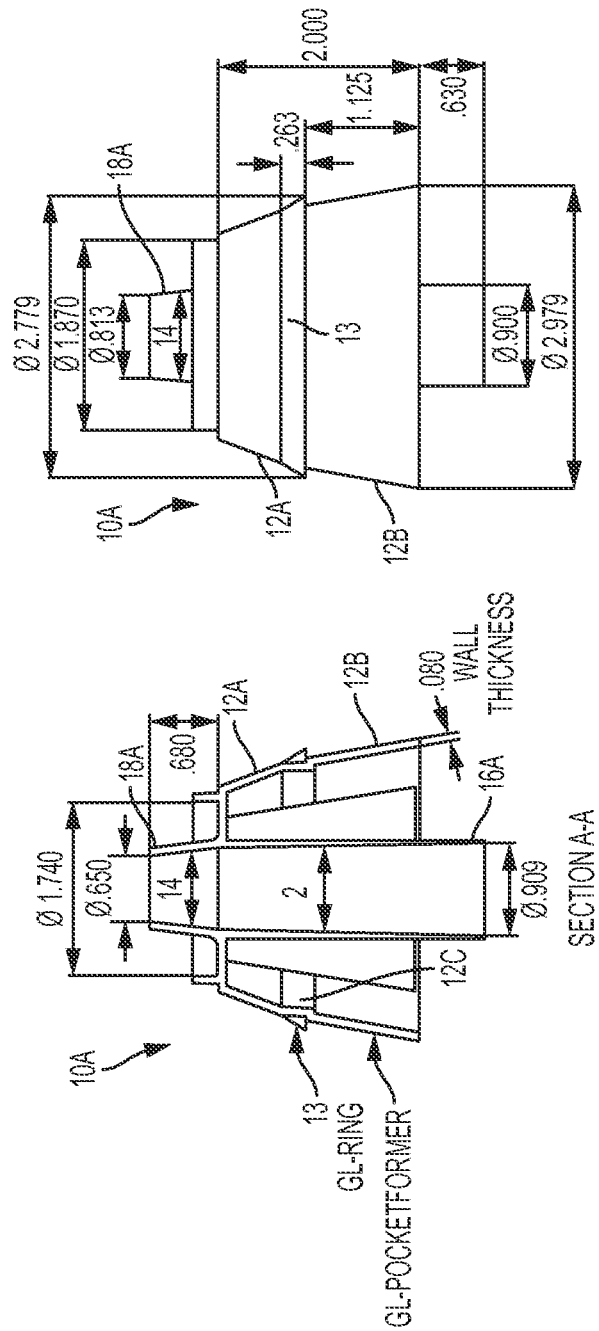

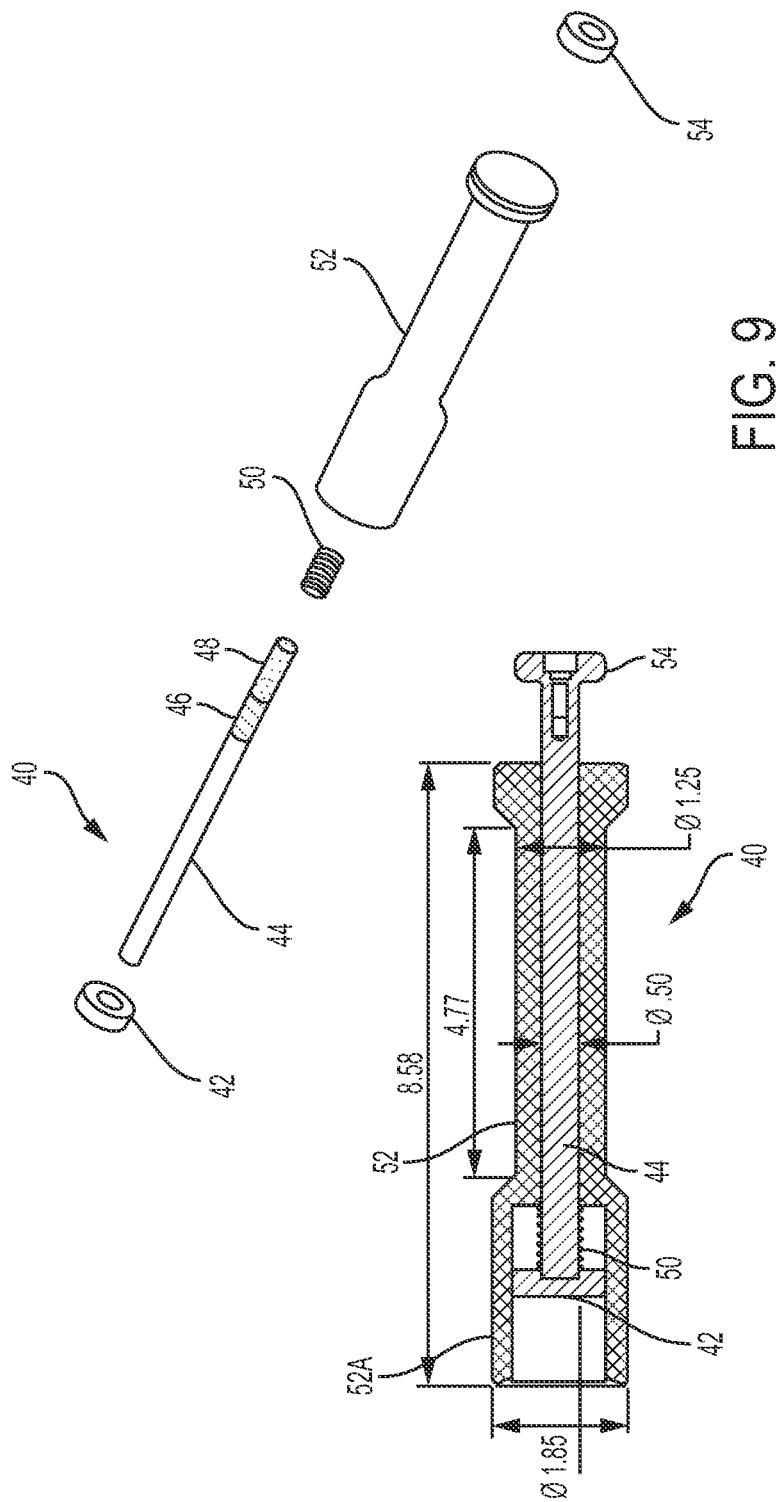

SECTION A-A

POCKETFORMER WITH RELEASABLE GROUT RING AND TENDON, TAIL GAUGE AND METHOD FOR USING

CROSS-REFERENCE TO RELATED APPLICATIONS

This application claims the benefit of prior-filed, U.S. Provisional Application No. 61/981,947, filed Apr. 21, 2014, the entire contents of which is hereby incorporated by reference.

FIELD

This disclosure is related to the field of encapsulated post tension concrete reinforcing systems. More specifically, the disclosure relates to structures for a pocketformer and a tendon tail length gauge usable with such systems.

SUMMARY

Encapsulated post tension concrete reinforcing systems known in the art include a cast nodular steel anchor base with a tapered wedge receiving bore. The outer surface of the anchor base is covered in an impermeable barrier material, such as plastic over most of its surface. The wedge receiving bore is not covered in the barrier material. An example of such a system with a tendon locked in the anchor is shown in FIGS. 1 and 2.

FIG. 1 shows the anchor base 1 covered by the barrier material 2. The barrier material 2 may include an extension tail 4 to enable sealing engagement with a sheathed tendon 3 inserted through the tail 4 and through the wedge receiving bore in the anchor base 1. An unsheathed portion 3A of the tendon 3 is locked into the anchor base by wedges 6 of types well known in the art. The concrete which is being reinforced using the devices shown in FIG. 1 is omitted from the drawing for clarity of the explanation. When concrete is poured, a device called a pocketformer, explained below with reference to FIG. 3 is inserted into the open end of the anchor base 1 so that a pocket opening is formed in the concrete. The pocket enables pulling on the tendon 3, inserting the wedges 6, and releasing the tendon 3 so that it is locked in tension in the anchor base. The exposed end of the tendon 3 is then cut off to a selected length. Referring to FIG. 2, after the end of the tendon is cut off, an exposed portion of the unsheathed tendon 3A extends a selected length outward from the anchor base (1 in FIG. 1). A grease filled cap 7 may then be inserted onto the anchor base such that the cap 7 forms a fluid tight seal with the barrier material. In this way, moisture is excluded from the tendon and anchor, thereby reducing the risk of corrosion.

An example of a pocketformer known in the art is shown in FIG. 3. The pocketformer 10 is generally disposed over one end of the anchor base (1 in FIG. 1). A tapered end 18 fits inside the wedge receiving bore of the anchor base to exclude cement from entering the bore. A tapered, cylindrical pocketforming surface 20 excludes poured cement from the volume defined by the pocketformer 10. For some applications, e.g., where the anchor base is not a terminal anchor but is only an intermediate anchor, a tube 14 may extend through the entire length of the pocketformer 10 to enable the tendon to pass through. After the cement cures, the pocketformer may be removed, and the tendon installation as described above may be performed. The pocket formed by the pocketformer 10 shown in FIG. 3 provides a generally smooth tapered surface to the wall of the pocket. After the tendon installation is completed, the pocket may be filled with cement or grout.

BRIEF DESCRIPTION OF THE DRAWINGS

FIG. 1 shows an example of a prior art encapsulated anchor base.

FIG. 2 shows a detail of part of the anchor base after installation of a tendon and a grease cap after cutting off an end of the tendon.

FIGS. 4 and 5 show sectional and side views, respectively, of a pocketformer according to one aspect of the present disclosure.

FIGS. 9 and 10 show, respectively, an exploded view and an assembled view of another embodiment of a tail gauge.

DETAILED DESCRIPTION

FIG. 4 shows a cross section of an example embodiment of a pocketformer according to the present disclosure. A pocketformer body 10A may include a tube end 18A for insertion into the wedge receiving bore of the anchor base. A tube 16A may extend through the entire length of the center of the pocketformer body 10A. An exterior surface of the pocketformer body 10A may be tapered, e.g., generally conical in shape. In the present example the conical shape may have a first taper angle section 12B, a second taper angle section 12A having a different taper angle than the first taper angle section 12B, and approximately in the longitudinal center of the tapered sections 12A, 12B, a substantially constant diameter section 12C (i.e., a section that forms a substantially right circular cylinder shape). The pocketformer 1 body 0A may be made from any suitable material known in the art for making pocketformers, typically plastic, but the choice of material is not a limitation of the scope of the present disclosure.

A grout ring 13 may be placed on the constant diameter section 12C. In internal diameter of the grout ring 13 and the external diameter of the constant diameter section 12C may be selected such that the grout ring 13 will remain in place by friction but may be readily applied to the exterior of the pocketformer body 10A by light hand pressure.

A side view of the pocketformer of FIG. 4 is shown in FIG. 5, wherein the features of the first 12B and second tapered 12A portions and the grout ring 13 may be better observed. While the example pocketformer shown in FIGS. 4 and 5 has two different taper angles on the first and second tapered sections, it is within the scope of the present disclosure for the taper angles to be the same.

Figure 3:
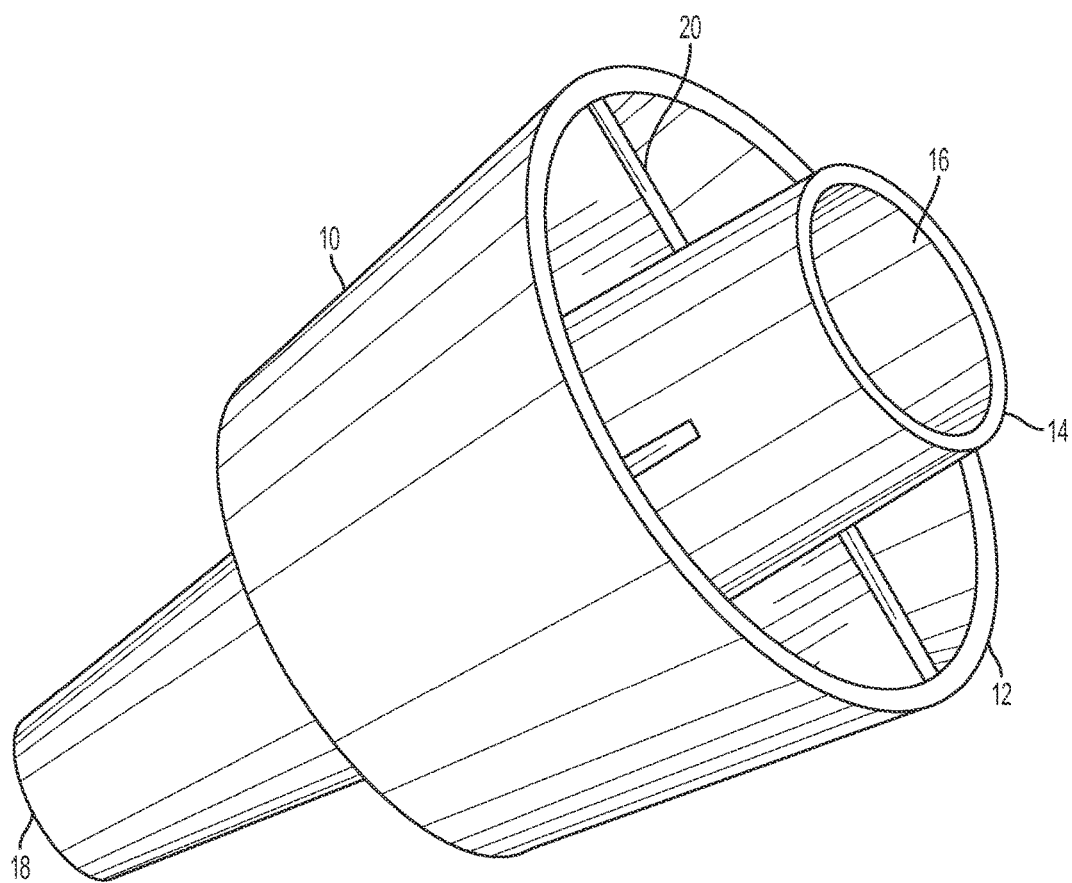
FIG. 3 shows an example of a prior art pocketformer.
Figure 6:
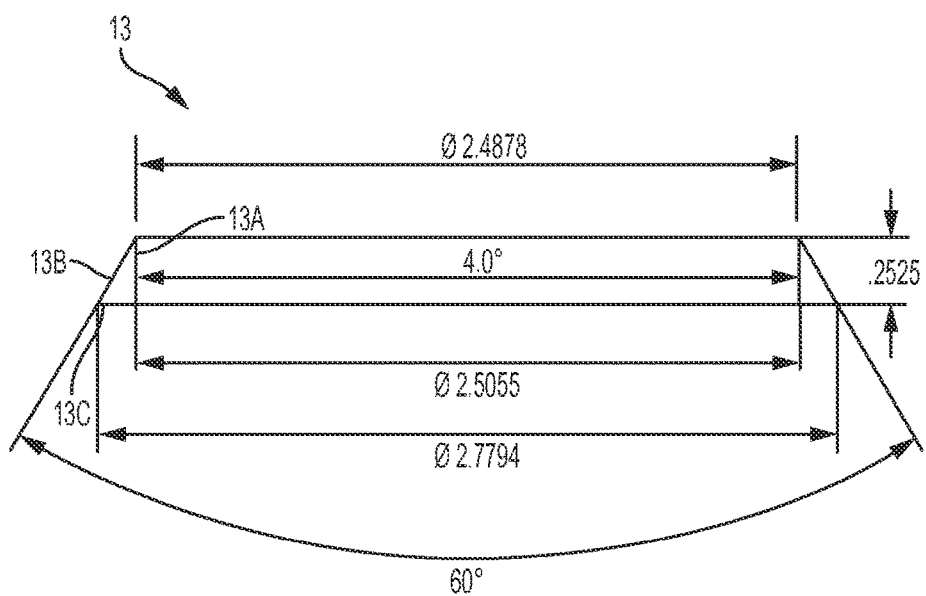
FIG. 6 shows an example grout ring.

FIG. 6 shows an example grout ring 13 in more detail. An inner surface 13A of the grout ring 13 may be generally constant internal diameter, as explained above to fit on the constant diameter portion (12C in FIG. 4) of the pocketformer body (10A in FIG. 4). An exterior surface 13B of the grout ring 13 may have a beveled or tapered edge. When installed on the pocketformer body as shown in FIG. 4, the exterior surface of the grout ring may form a ledge 13C that is substantially transverse to the longitudinal axis of the pocketformer body and the interior surface 13A. The grout ring 13 may be made from plastic or similar material, although the material chosen is not a limit on the scope of the present disclosure. The present example embodiment of the grout ring 13 may have an exterior surface shaped for form a ledge, however other shapes for the outer surface of the grout ring 1 may be used, provided that they form a shape in the concrete which tends to retain the grout ring in the concrete while the pocketformer is removed therefrom.

When the pocketformer and grout ring assembled as shown in FIG. 4 are applied to an anchor base, and concrete is then poured and cured, removing the pocketformer will leave the grout ring 13 in place because of the respective shapes of the ledge (13C in FIG. 6) and the interior surface (13A in FIG. 6). The grout ring 13 will in effect slide off the pocketformer body when the pocketformer is removed from the pocket. The grout ring 13 may be subsequently removed from the pocket, e.g., by prying it out with a common hand tool such as a screwdriver. Removing the grout ring 13 will leave a reverse tapered ledge in the surface of the pocket. The foregoing will be shown in more detail with reference to FIG. 11, however, such a ledge may provide a gripping surface if the pocket is subsequently filled with cement or grout. In other embodiments, a pocket cap may be inserted into the open end of the pocket, wherein the cap, explained in more detail below with reference to FIGS. 12-14, may have a feature that enables the cap to lock on the ledge.

After the concrete is cured and the pocketformer is removed, the tendon (3 in FIG. 1) may be stripped of its sheath (see 3 in FIG. 1) for a selected length, and place in tension. The wedges (6 in FIG. 1) may be applied to the exterior surface of the unsheathed tendon (3A in FIG. 1), and the tension of the tendon then released so that a selected amount of tension remains in the tendon (which is locked in place in the anchor base by the wedges). The end of the unsheathed tendon may be cut to a selected length and the grease cap (7 in FIG. 2) may be installed as explained above.

Figure 7:
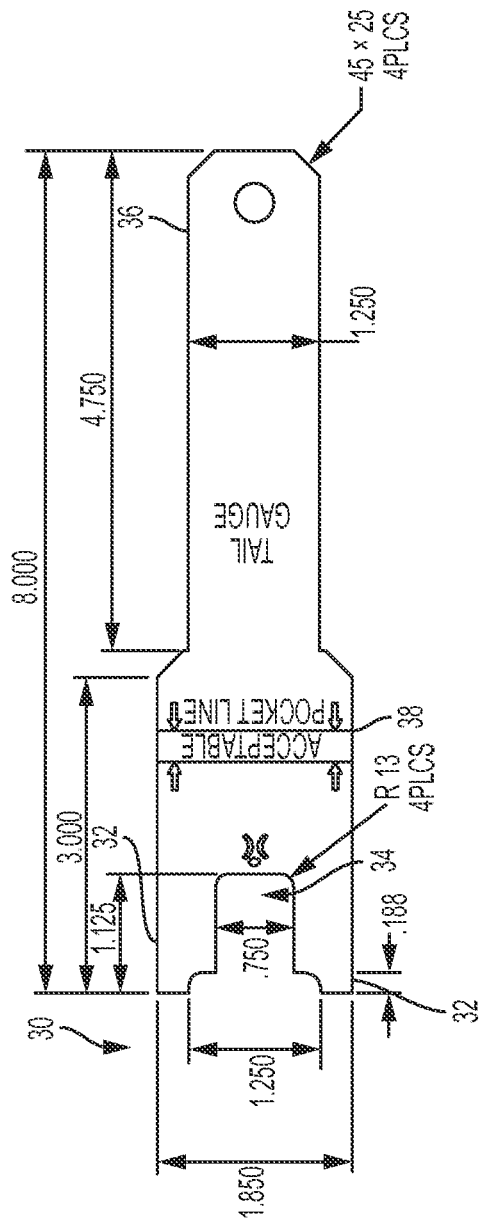
FIGS. 7 and 8 show top and side views, respectively, of one example of a tail gauge.
Figure 8:
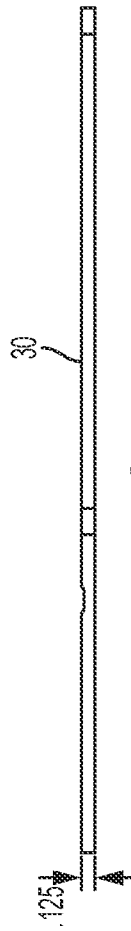

It has been observed that the length of the unsheathed tendon after cutting (called the "tail") may in some cases be too long for the grease cap (7 in FIG. 2) to effectively seat on the barrier material (2 in FIG. 1), thereby enabling entry of moisture into the anchor base and tendon therein. Such moisture entry may enable corrosion to begin, thus endangering the reinforcing of the structure by the tendon and anchor system. If the pocket has already been filled with grout, rework to shorten the tail and install a new grease cap may be difficult and expensive. Referring to FIG. 7, an example embodiment of a tail gauge 30 is shown in plan view. The tail gauge 30 may be molded from plastic or other suitable material, but the material is not a limit on the scope of the present disclosure. The tail gauge may include a handle end 36 for enabling the user to insert the tail gauge 30 into the pocket by hand. Contact tangs 32 may be provided on opposite sides of a depth gauge recess 34. The contact tangs 32 and the recess 34 may have dimensions selected such that when the tail gauge 30 is inserted into the pocket, the tangs 32 will contact the anchor base or the barrier material (see FIG. 1). If the tendon tail is not excessive length, an "ACCEPTABLE" indicator 38 may be flush with the surface of the concrete forming the pocket. If the tendon tail is too long, the ACCEPTABLE indicator will be disposed outside the end of the concrete. Thus, the user has immediate indication that the tail is too long and installation of the grease cap (7 in FIG. 2) may be ineffective. A side view of the tail gauge 30 in FIG. 7 is shown in FIG. 8.

FIG. 9 shows an exploded view of another embodiment of a tail gauge 40. The tail gauge 40 may include a gauge housing 52, a spring 50, an indicator rod 44 and a contact end 42 for the indicator rod 44. The indicator rod 44 may include a cap 54 to prevent the indicator rod 44 from falling out of the gauge housing 52. The indicator rod 44 may include colored or other identifiable segments. A first segment 48 indicates that the tendon tail does not exceed the length limitation. A second segment 46 indicates that the tendon tail is too long. An assembled, sectional view of the present embodiment of the tail gauge is shown in FIG. 10. A bottom end 52A of the gauge housing 52 may have an enlarged diameter selected to match the diameter of the wedge receiving bore or the barrier material on the anchor base.

Figure 11:
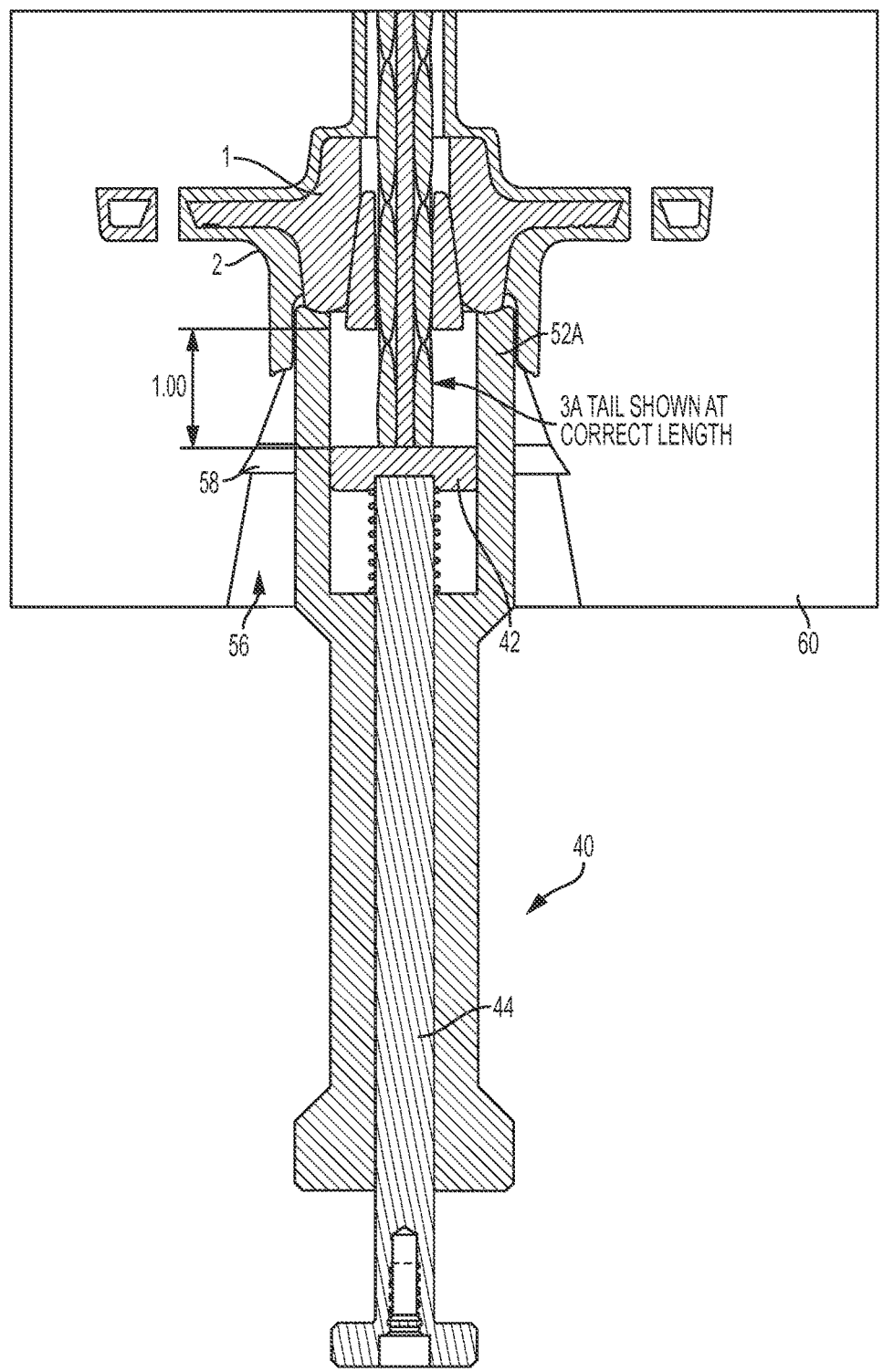
FIG. 11 shows the tail gauge of FIG. 7 being used to measure a tendon tail to ensure the tendon tail does not exceed a predetermined length limitation.

FIG. 11 shows the tail gauge of FIGS. 9 and 10 being used to check the length of a tendon tail. The bottom end 52A is shown in contact with the anchor base 1. The contact end 42 of the indicator rod 44 is shown in contact with the cut end 3A of the tendon. Also visible in FIG. 11 is the pocket 56 formed in the concrete 60 by the pocketformer (10A in FIG. 4), including the ledge 58 formed by the grout ring (13 in FIG. 6). The grout ring has already been removed in the view in FIG. 11.

If the tail gauge indicates that the tail is within the length limit, then the grease cap (7 in FIG. 2) may be installed and the pocket may be filled with grout. The ledge 58 may provide a feature to reduce the possibility of the grout falling out of the pocket 56 after the grout cures.

Figure 12:
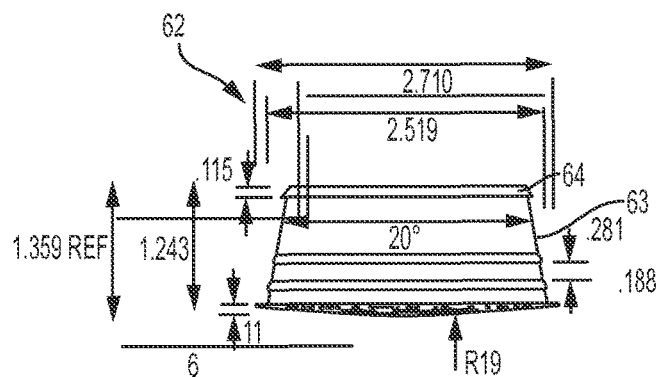
FIGS. 12 through 14 show various views of an example of a pocket cap that may be inserted into the pocket instead of using grout filler.
Figure 13:
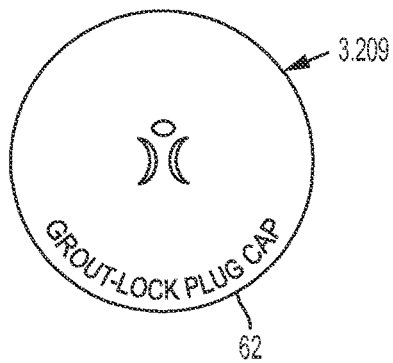
Figure 14:
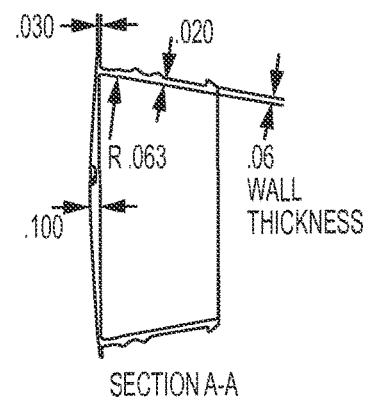

In another embodiment, and referring to FIG. 12, the pocket may be closed without the use of grout by using a pocket cap 62. The pocket cap 62 may include a tapered exterior surface 63 having a taper that matches the taper on the first portion (12B in FIG. 4) of the pocketformer. The pocket cap 62 may also include a lip 64 that substantially matches the shape of the grout ring (13 in FIG. 6). The pocket cap 62 may be made from plastic or similar material such that the features, including the lip 64 on the pocket cap are sufficiently flexible that the pocket cap 62 may flex to enable the lip 64 to lock in place in the ledge (58 in FIG. 11). The pocket cap 62 may be removed such as by prying in the event the components in the pocket require servicing. FIGS. 13 and 14 show end and sectional views, respectively, of the pocket cap 62.

A pocketformer, tail gauge and pocket cap according to the various aspects of the present disclosure may reduce installation costs, may reduce defective installations and may more reliably close a pocket formed in a post tension reinforced concrete structure.

While the invention has been described with respect to a limited number of independent embodiments, those skilled in the art, having benefit of this disclosure, will appreciate that other independent embodiments can be devised which do not depart from the scope of the invention as disclosed herein. Accordingly, the scope of the invention should be limited only by the claims.

What is claimed is:
1. A pocketformer, comprising:
   a pocketformer body having an exterior surface, the exterior surface including at least one portion along a length thereof having a tapered profile and at least one portion along a length thereof having a substantially constant diameter, the pocketformer body having a feature for engaging an anchor base in a concrete structure prior to pouring concrete; and a grout ring having a substantially constant inner diameter substantially equal in diameter to the at least one portion having a substantially constant diameter, the grout ring having an exterior surface shaped to cause retention of the grout ring in set concrete, the grout ring being removably affixable to the at least one portion having a substantially constant diameter.

2. The pocketformer of claim 1 wherein the grout ring is removably affixed to the at least one portion having a substantially constant diameter such that the exterior surface of the grout ring is in opposed taper direction to the exterior surface of the pocketformer body.

3. The pocketformer of claim 1 wherein the exterior surface of the grout ring is shaped to form a ledge in the concrete.

4. The pocketformer of claim 1 wherein the exterior surface of the pocketformer body comprises two tapered portions, each portion having a different taper angle disposed on opposed longitudinal ends of the at least one portion having a substantially constant diameter.

5. The pocketformer of claim 1 wherein the pocketformer body includes an outer member defining the exterior surface and a tube extending through the outer member, an end of the tube configured to be positioned in a wedge cavity of the anchor.

6. A pocketformer for forming a pocket adjacent a concrete anchor, the pocketformer comprising:

a body including a first end, a second end, and an outer surface extending between the first end and the second end, the first end configured to abut the anchor, the outer surface including a first portion having a tapered profile and a second portion having a substantially cylindrical profile, a diameter of the first portion proximate the first end being less than a diameter of the first portion proximate the second end; and a ring removably coupled to the second portion, the ring having an exterior surface shaped to engage the concrete after it sets and retain the ring in the concrete.

7. The pocketformer of claim 6, wherein the exterior surface of the ring has a tapered profile.

8. The pocketformer of claim 7, wherein the ring is removably coupled to the second portion such that the tapered profile of the ring is oriented in an opposite direction to the tapered profile of the first portion.

9. The pocketformer of claim 6, wherein the exterior surface of the ring is shaped to form a ledge in the concrete facing toward the anchor.

10. The pocketformer of claim 6, wherein the outer surface of the body further includes a third portion having a tapered profile, wherein the second portion is positioned between the first portion and the third portion.

11. The pocketformer of claim 6, wherein the outer surface of the body further includes a third portion having a tapered profile, wherein the first portion defines a first taper angle and the third portion defines a second taper angle different from the first taper angle.

12. The pocketformer of claim 6, wherein the first end, the second end, and the outer surface are formed on an outer member, the body further including a tube extending through the outer member, an end of the tube configured to be positioned in a wedge cavity of the anchor.

13. The pocketformer of claim 12, wherein the tube includes a first end extending axially beyond the first end of the outer member and a second end extending axially beyond the second end of the outer member.

\* \* \* \* \*